US007546388B2

(12) United States Patent
Yamamura

(10) Patent No.: US 7,546,388 B2
(45) Date of Patent: Jun. 9, 2009

(54) OUTPUT DEVICE USING EMAIL TO COMMUNICATE AND RESOLVE CONFLICT BETWEEN MULTIPLE FUNCTIONS AVAILABLE FOR OUTPUT PROCESS

(75) Inventor: Shinichi Yamamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 11/211,040

(22) Filed: Aug. 24, 2005

(65) Prior Publication Data

US 2006/0044606 A1 Mar. 2, 2006

(30) Foreign Application Priority Data

Aug. 27, 2004 (JP) ............................. 2004-248566

(51) Int. Cl.
*G06F 3/00* (2006.01)
(52) U.S. Cl. ............................. 710/8; 710/10; 709/206
(58) Field of Classification Search ................. 709/206; 358/1.15, 1.13; 707/100; 715/500; 710/15, 710/8, 10

See application file for complete search history.

(56) References Cited

U.S. PATENT DOCUMENTS 6,889,263 B2 * 5/2005 Motoyama ................... 710/15
2003/0025934 A1   2/2003 Takamiya
2004/0239984 A1 * 12/2004 Ishii et al. ................... 358/1.15
2004/0267888 A1 * 12/2004 Oswald ....................... 709/206
2005/0036167 A1 *  2/2005 Atsumi ....................... 358/1.15
2005/0081137 A1 *  4/2005 Ferlitsch ..................... 715/500
2005/0086240 A1 *  4/2005 Richardson et al. ......... 707/100
2005/0231746 A1 * 10/2005 Parry et al. ................. 358/1.13
2006/0023248 A1 *  2/2006 Reese et al. ................. 358/1.15
2006/0192990 A1 *  8/2006 Tonegawa ................... 358/1.15

FOREIGN PATENT DOCUMENTS

JP          2003-46690         2/2003

* cited by examiner

*Primary Examiner*—Le Luu
(74) *Attorney, Agent, or Firm*—Canon USA Inc IP Div

(57) ABSTRACT

In order to permit a user to easily understand an available post-process, even in a driverless environment wherein a driver program has not been prepared for a computer terminal operated by the user, upon receiving an email including a specific case name and an attached file (print data), an image forming apparatus transmits, to the transmission source for the email, a reply email that includes function information that is related to multiple functions available for the output process performed by the image forming apparatus.

15 Claims, 10 Drawing Sheets

File (F)　Edit (E)　View (V)　Mail (M)　Tool (T)　Help (H)

[toolbar icons] × [more icons]

Sender :
Case Name : Re : Conflict occur !!
Date and Time : Wed. 12 Nov 2003 17 : 22 : 50 +0900

**\*\*\* Get Information Result \*\*\***

PageSetup
>....... 4UP
Finisher
>....... Z-Fold
>....... Rotate
>....... 2-Sided Printing Attached application file with proper setting.

Conflict occurs!!

Following settings has conflict.　⎫
▶>....... Z-Fold　　　　　　　　⎬ ~501
>....... Rotate　　　　　　　　⎭

--
(http://xxx.yyy.com) ~112
zzz@zxx.co.jp

OUTPUT DEVICE USING EMAIL TO COMMUNICATE AND RESOLVE CONFLICT BETWEEN MULTIPLE FUNCTIONS AVAILABLE FOR OUTPUT PROCESS

BACKGROUND OF THE INVENTION

1. Field of the Invention

The present invention relates to an output processing apparatus having a so-called finishing function that includes, for example, an editing function in a printing process, an output processing method and a program therefor.

2. Description of the Related Art

The use of digital copiers having a finishing function has spread, provided mainly by a unit called a finishing unit that includes a sorting function, for sorting multiple printed matters in accordance with individual copies, a stapling function, for stapling the individual copies, and a Nin1 function (N denotes the number of pages included on one sheet), for arranging the layout of multiple pages on one sheet. When the digital copier is employed by itself, an operator, for example, can designate the finishing function by manipulating the operation panel of the digital copier.

Not only is the digital copier used by itself, but also, the digital copier can be connected to a host computer via various types of interfaces, so that a system can be constructed wherein image data received from the host computer are output by the digital copier. In such a system, when a driver program for controlling the digital copier is prepared in the host computer connected to the digital copier, the finishing function, which is to be performed in association with a printing request, can be designated via a user interface provided by the driver program. In this case, the host computer writes the designation of the finishing function in a printer job header, for example, in accordance with a data form that agrees with the digital copier, and transmits print data, as the main body of a print job, to the digital copier. Upon receiving the job, the digital copier analyzes the designation written in the header for the finishing function, and performs the designated function at the same time as the printing.

As is described above, when the driver program for controlling the digital copier has been prepared in the host computer, the finishing function can be employed by the host computer. However, in a case wherein a driver program corresponding to the function of the digital copier that is employed has not been prepared in the host computer, i.e., in a driverless environment, the finishing function cannot be designated by the host computer.

As a method whereby the host computer designates the finishing function in a driverless environment, a technique is disclosed according to which specific email addresses and specific finishing function setups are correlated with each other in advance, and when a print job is transmitted to an email address corresponding to a desired finishing function, a printing process using this finishing function can be performed (e.g., patent document 1: Japanese Laid-Open Application No. 2003-46690 (corresponding to US AA2003025934)). According to the method described in patent document 1, however, even in a driverless environment, so long as email software for the transmission/reception of email has been prepared in the host computer the finishing function can be designated.

While the finishing processing (the post-processing) can be designated using the finishing designation method that employs the email software described in patent document 1, there is no way that the user of the host computer can easily ascertain what kind of finishing function is available at the digital copier that will do the printing. For example, it is very difficult to ascertain whether a digital copier that is employed for printing has a stapling function for stapling individual copies and a Nin1 function for designing a layout for multiple pages. Conversely, according to the method described in patent document 1, one requirement is that a user know, in advance, what functions are available at a digital copier and the email addresses that can be employed to access and use the functions. A further requirement is that a correlation between the email addresses and the functions be established by the digital copier.

Further, conventionally, when correlations between the functions available at a digital copier and the email addresses are somehow identified, there is no danger of a conflict condition arising that involves any of the functions. In other words, even when, for example, double-sided OHP printing by a digital copier is inhibited, a print job request can still be transmitted that includes the inhibited conditions, "OHP printing+double-sided". As a result, either double-sided printing or OHP printing is ignored, or both setup conditions are ignored. This problem does not occur when a driver program prepared in a host computer is employed for each digital copier, because the driver program notifies the digital copier of a conflict in advance.

SUMMARY OF THE INVENTION

The present invention is directed to an output processing apparatus that permits a user to easily ascertain the post-processing that can be performed, even in a driverless environment wherein a driver program is not present in the computer terminal operated by the user, an output processing method and a program therefor.

The present invention is also directed to an output processing apparatus that permits a user to easily ascertain the post-processing that can be performed, in a driverless environment, and to set the post-processing using a simple method, and an output processing method and a program therefor.

In one aspect of the present invention, an output processing apparatus includes: an output unit configured to perform an output process relative to an output medium that is based on output data; an email processing unit configured to transmit and receive email via a network; and a transmission unit configured to transmit to an email transmission source a reply email including function information related to multiple functions available for the output process, responsive to the email processing unit receiving an email that includes at least one of a specific case name, a specific character string and a specific attached file.

In one embodiment, the output processing apparatus further includes a setup unit configured to perform a function setup. When the email transmission source has transmitted a setup information email that includes function setup information relating to a desired function, to be set based on the function information included in the reply email, and when the email processing unit has received the setup information email, the setup unit performs a function setup in accordance with the function setup information included in the setup function email. The apparatus also includes an output control unit for controlling the output unit to perform the output process in accordance with the function setup by the setup unit.

In one embodiment, the output process performed by the output unit includes an organizing process relative to multiple output media, and wherein the function setup information includes information for setting a function related to the organizing process. The organizing process is specifically a process (post-processing) for arranging, in order, output media, such as printed paper.

In another aspect of the present invention, an output processing method employing an output processing apparatus that includes an output unit, for performing an output process relative to an output medium based on output data, and an email processing unit, for transmitting and receiving email via a network, includes: a first reception step of receiving in the email processing unit an email that includes at the least one of a specific case name, a specific character string and a specific attached file; and a transmission step of transmitting, to a transmission source of the email received at the first reception step, a reply email that includes function information related to multiple functions available for the output process.

Further features of the present invention will become apparent from the following description of exemplary embodiments (with reference to the attached drawings).

BRIEF DESCRIPTION OF THE DRAWINGS

FIG. 6 is a diagram showing an example description of a conflict transmission email reply when a conflict has occurred at the printing setup;

DESCRIPTION OF THE EMBODIMENTS

The embodiments will now be described while referring to the accompanying drawings. In the following explanation, a multi-functional apparatus having a printing function and a copying function is employed as an output processing apparatus according to one embodiment of the present invention. Specifically, an output processing system including a multi-functional apparatus connected to a network will be described.

Figure 1:
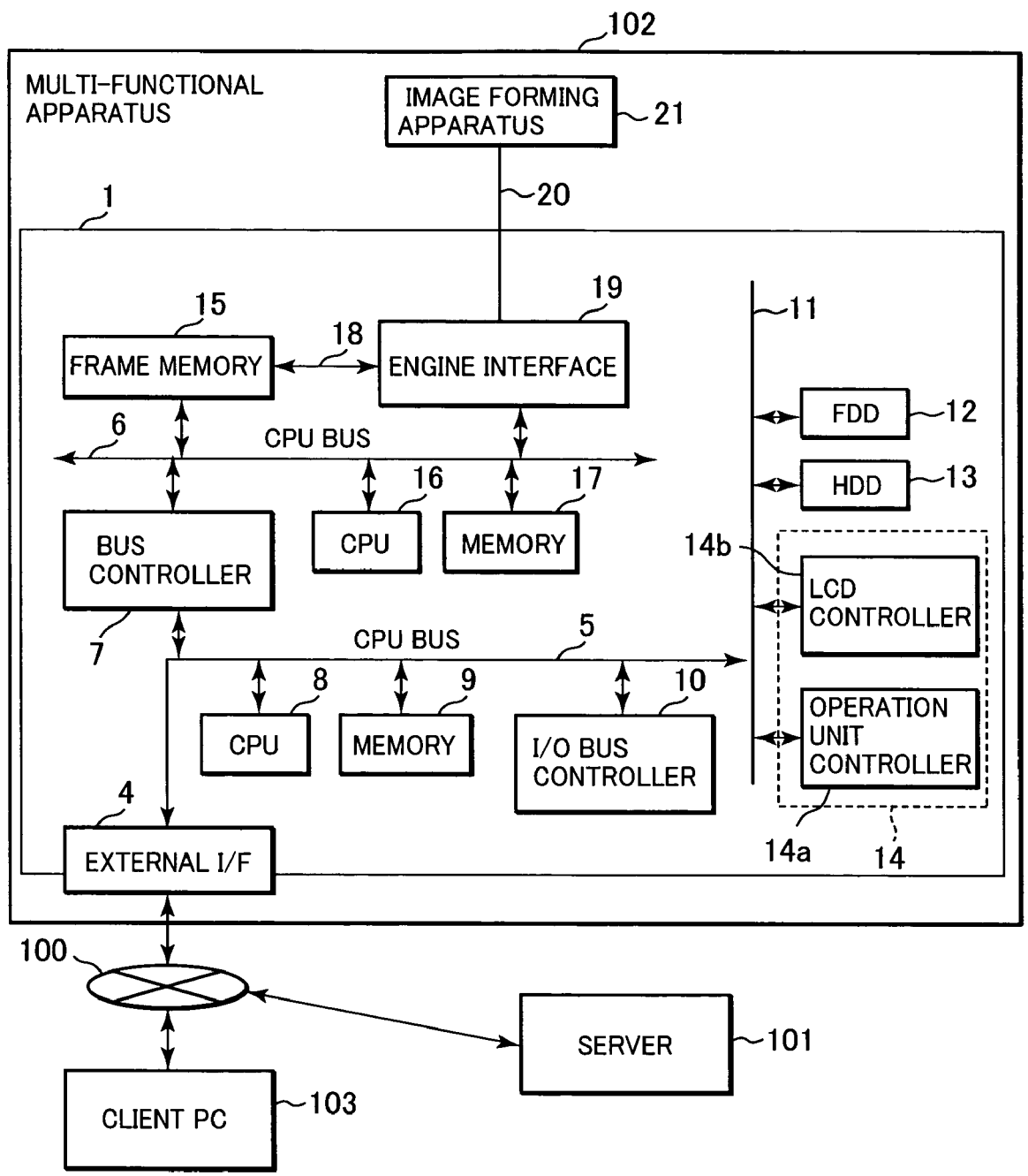
FIG. 1 is a schematic block diagram showing the configuration of an output processing system that includes a multi-functional apparatus according to one embodiment of the present invention.

FIG. 1 is a schematic block diagram showing the configuration of the output processing system including the multi-functional apparatus according to the embodiment of the invention. In FIG. 1, a network 100 is a communication network such as a local area network (LAN). A server 101 stores a printer driver for a multi-functional apparatus 102 at a predetermined location as information that is related to the editing function of the multi-functional apparatus 102, which has other functions, such as a copying function and a printer function. A client personal computer (PC) 103 requests, via the network 100, the multi-functional apparatus 102 to perform printing, or requests, via the network 100, the server 101 to provide content. The multi-functional apparatus 102 and the client PC 103 of this embodiment have an included function for the transmission and reception of email.

As shown in FIG. 1, the multi-functional apparatus 102 of the embodiment includes: an image processing apparatus 1, for performing communication via the network 100 and for performing the editing function, and an image forming apparatus 21, for forming images on print media under the control of the image processing apparatus 1. The editing function in this case is not simply a general editing function, such as the setup for a layout, but is an editing function in a broader sense and includes a so-called finishing function (post-processing function), such as a sorting function and a stapling function.

First, the internal arrangement of the image processing apparatus 1 will be explained. An external interface (I/F) 4 is connected to the network to perform communication with the server 101 and the client PC 103. That is, the image processing apparatus 1 is connected to the client PC 103 via the external I/F 4 and the network 100. The image processing apparatus 1 is also connected to the image forming apparatus 21 via an engine interface 19 and an interface cable 20.

A first central processing unit (CPU) 8 controls input/output devices (I/O) other than those connected to the image forming apparatus 21. The external I/F 4, which serves as the interface to the client PC 103, a memory 9 for storing programs, an I/O bus controller 10 which controls an I/O bus 11, and a bus controller 7 are connected to a first CPU bus 5. The first CPU bus 5 is in turn connected, via the bus controller 7, to a second CPU bus 6 that is used by a second CPU 16, which will be described later. The I/O bus controller 10 controls general-purpose I/O's, such as a flexible disk drive 12 connected to the I/O bus 11, a hard disk drive 13, a liquid crystal display (LCD) controller 14*b* and an operation unit controller 14*a*. An operation panel 14 is constituted by an LCD, which is controlled by the LCD controller 14*b*, and an operation unit, which is controlled by the operation unit controller 14*a*.

The second CPU 16 controls the connected image forming apparatus 21, and also performs a process for expanding image data stored in a frame memory 15. A memory 17 is used to store programs, and when power is turned on, a control program is loaded from the hard disk drive 13 via the bus controller 7. The memory 17 is also used for communication with the first CPU 8. The engine interface 19 is connected to the second CPU bus 6, and the image forming apparatus 21 is controlled while various setups are performed. A video bus 18 is a special bus, for images, along which image data that have been expanded by the second CPU 16 and stored in the frame memory 15 are transmitted to the engine interface 19, and further along to the image forming apparatus 21.

Figure 2:
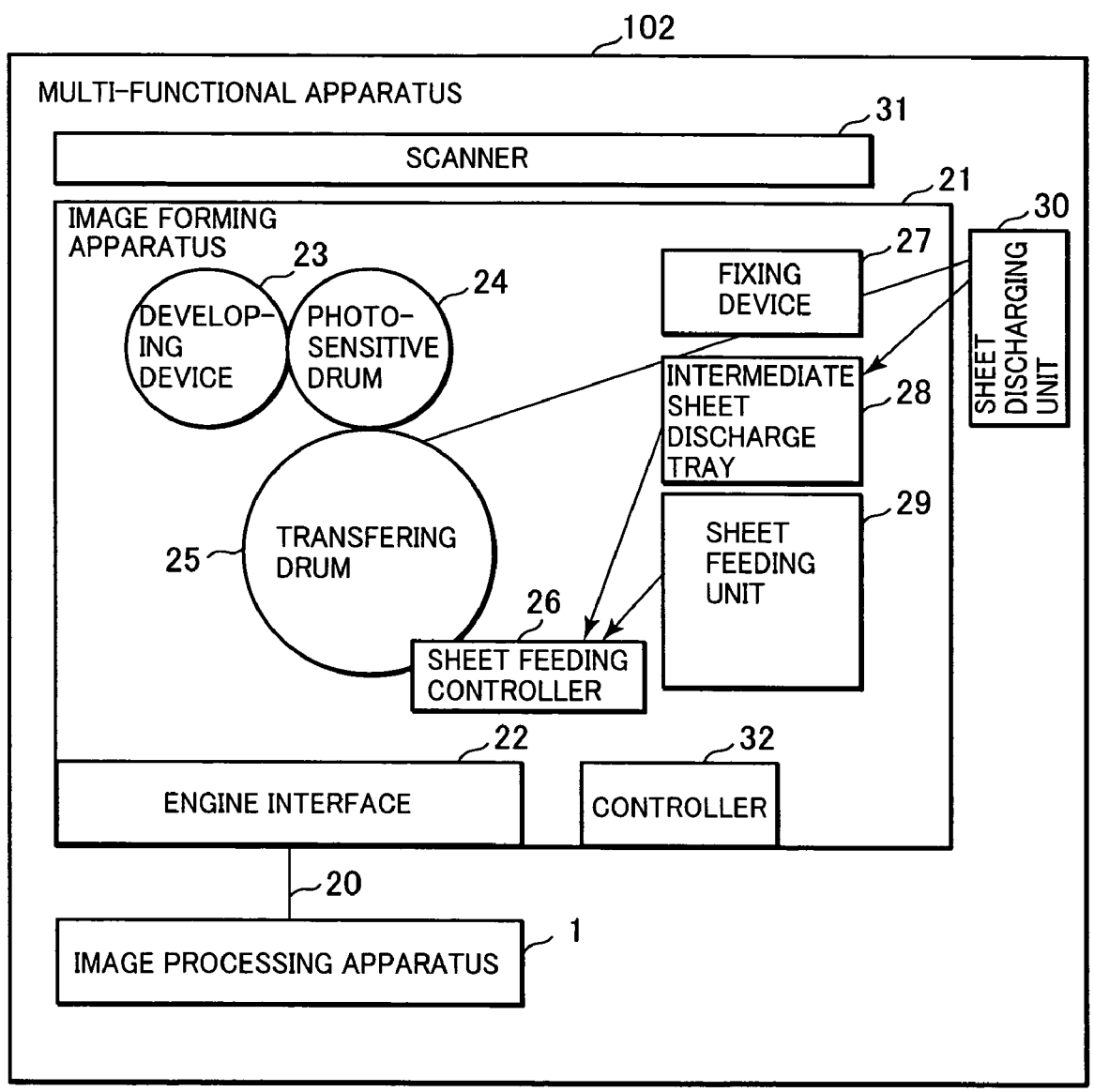
FIG. 2 is a diagram showing an example internal arrangement for the multi-functional apparatus in FIG. 1 and the image forming apparatus of the multi-functional apparatus.

An explanation will now be given for the multi-functional apparatus 102 connected to the image processing apparatus 1 and the internal arrangement of the image forming apparatus included in the multi-functional apparatus 102. FIG. 2 is a diagram showing an example internal arrangement for the multi-functional apparatus 102 in FIG. 1 and the image forming apparatus 21 of the multi-functional apparatus 102. In FIG. 2, an engine interface 22 of the image forming apparatus 21 is connected, via the interface cable 20, to the image processing apparatus 1. Based on the image data transmitted by the image processing apparatus 1, a latent image is formed on a photosensitive drum 24, and is developed by a developing device 23. In accordance with an instruction issued by the image processing apparatus 1, a sheet feeding controller 26 feeds a sheet from a sheet feeding unit 29, or an intermediate sheet discharge tray 28, and mounts the sheet on a transferring drum 25. Thereafter, the image formed on the photosensitive drum 24 is transferred to the sheet mounted on the transferring drum 25 and is fixed by a fixing device 27. After the image has been fixed to the sheet, the image bearing sheet is either discharged to a sheet discharge unit 30 or stored, in accordance with an instruction issued by the image processing apparatus 1, in the intermediate sheet discharge tray 28. Further, image data read by a scanner 31 are processed by a controller 32, and based on the image data, printing is performed in the same manner as for the image data transmitted by the image forming apparatus 21.

Figure 3:
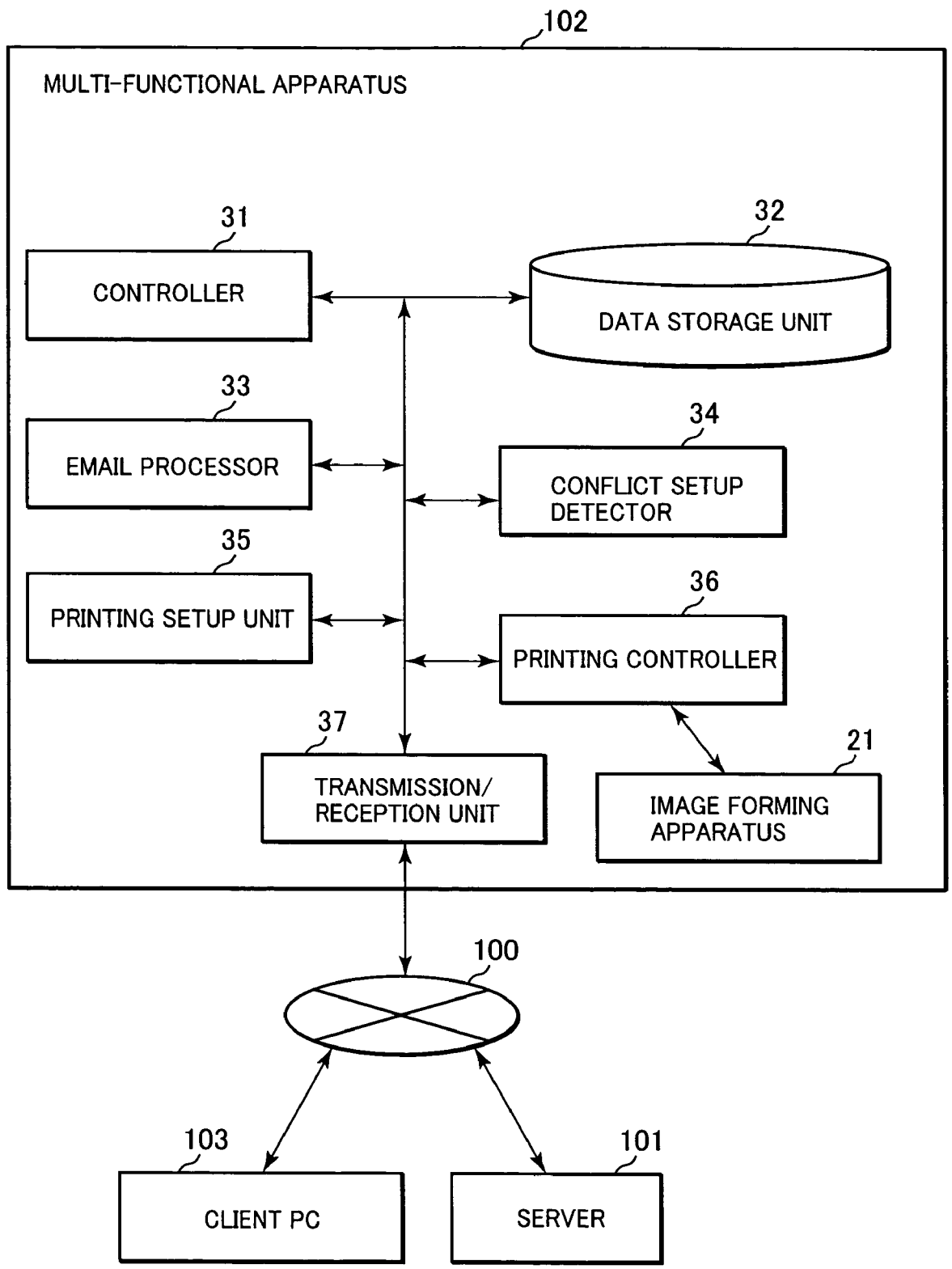
FIG. 3 is a block diagram showing the functional arrangement that is the feature of the multi-functional apparatus according to the embodiment.

An explanation will now be given for the functional arrangement of the multi-functional apparatus 101 of this embodiment that performs the characteristic processing. FIG. 3 is a block diagram showing the functional arrangement that is the feature of the multi-functional apparatus 102 according to the embodiment. In FIG. 3, the controller 31 controls the operation of the individual sections of the multi-functional apparatus 102 and the transmission of data. A data storage unit 32 is used to store URL information for displaying the GUI for the printer driver of the multi-functional apparatus 102 that is installed in the server 101, and information related to functions that can be set for the printing process and the post-process (finishing process) performed by the multi-functional apparatus 102. For the multi-functional apparatus 102 of this embodiment, the sorting function, the stapling function, for stapling the individual copies obtained by the sorting function, and the Nup function, for arranging N pages (N is a numeral of either 2, 4 or 9) on a single sheet as a layout, are, for example, available as post-processes, and a detailed explanation will be given for them later.

An email processor 33 exchanges email with the client PC 103 via a transmission/reception unit 37 and the network 100. The email processor 33 of this embodiment especially performs a function whereby, upon receiving an email for a predetermined case name from the client PC 103, information related to a post-process, such as the finishing process, that can be set for the printing process of the multi-functional apparatus 102 is examined in the data storage unit 32, and is transmitted in the text editing enabled form. Specifically, the email processor 33 transmits, to the client PC 103, an email containing a list of the names of functions, such as the sorting function, the stapling function and the Nup function, that can be set for use as a post-process. Then, a user edits the text of the email to leave as a statement only the function, selected from the list, that is desired to be performed as a post-process, and sends this, as a reply, to the multi-functional apparatus 102, with the print data to be printed attached. As a result, the multi-functional apparatus 102 receives from the client PC 103 an email, with attached print data, wherein is written the setup for the printing process (hereinafter referred to as the printing setup).

The email processor 33 also processes an email transmitted by the client PC 103 via the transmission/reception unit 37. Specifically, the email processor 33 obtains information (hereinafter referred to as function setup information) that is included in the received email and related to the printing setup, and print data that is attached to the email. The email processor 33 also has an included function for examining a case name in a received email, or for ascertaining the presence/absence of an attached file, to determine a succeeding process to be performed for the received email.

A conflict setup detector 34 refers to the function setup information obtained by the email processor 33, and detects printing setup conflicts among the printing setups included in the function setup information. When the conflict setup detector 34 detects a conflicting setup, the email processor 33 transmits a conflict transmission email to that effect to the client PC 103 that is an email transmission source. At this time, the email processor 33 includes, in the conflict transmission email, the URL used to refer to information (e.g., the GUI of a printer driver) related to the printing setup conflict. In this embodiment, the GUI of the printer driver designated by the URL is managed by the server 101.

A printing setup unit 35 refers to function setup information obtained by the email processor 33 to perform various setups for the image forming apparatus 21 during the printing process. A printing controller 36 permits the image forming apparatus 21 to print the print data obtained by the email processor 33 in accordance with the setup established by the printing setup unit 35. The transmission/reception unit 37 performs communication with the server 101 and the client PC 103 via the network 100. And the transmission/reception unit 37 also exchanges data, including email, via the network 100.

With the above described configuration, the multi-functional apparatus 102 performs a printing process in consonance with the printing setup designated in the email received from the client PC 103. Therefore, in a driverless environment wherein a driver program is not present in a computer terminal (the client PC 103 in this embodiment) employed by a user, so long as the email function is prepared in the computer terminal, the user can easily identify the available post-processes by using email, and can employ a simple method to designate a printing post-process. The functional arrangement of the multi-functional apparatus 102 is not limited to that shown in FIG. 3, and various common, multi-functional apparatus functions can be appropriately provided.

While referring to FIGS. 4 to 7, an explanation will now be given for a specific example of the finishing function setup processing performed by the multi-functional apparatus 102 in FIG. 3 in a driverless environment, and the printing processing performed in accordance with the setup.

Figure 4:
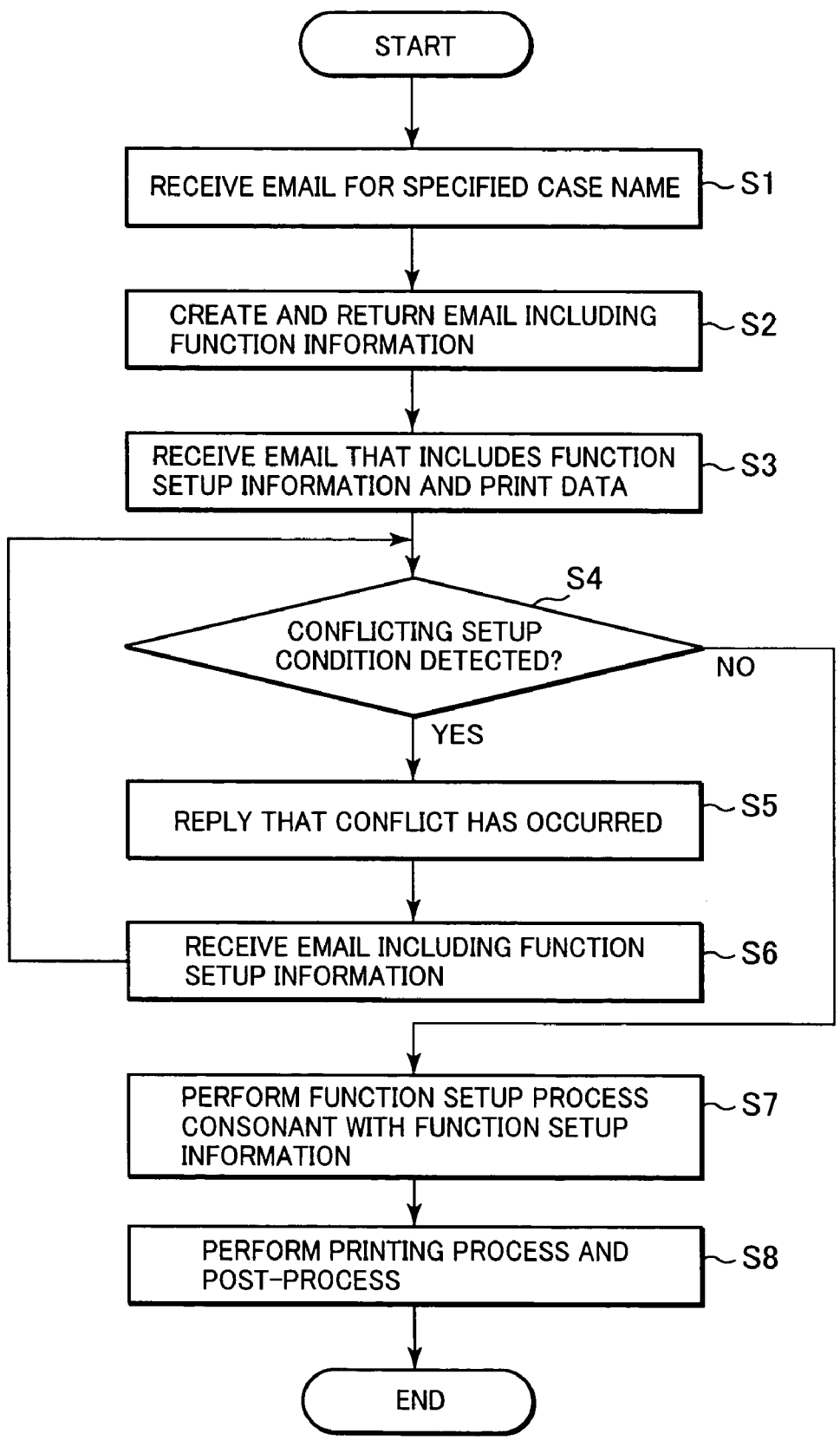
FIG. 4 is a flowchart showing the finishing function setup processing performed by the multi-functional apparatus in FIG.'s 1 to 3 in a driverless environment and the printing processing performed in consonance with the setup.

FIG. 4 is a flowchart showing the finishing function setup processing performed by the multi-functional apparatus 102 in FIGS. 1 to 3, and the printing processing performed in accordance with the setup. As a prerequisite, wherein the multi-functional apparatus 102 performs the processing in FIG. 4, first, the client PC 103 transmits to the multi-functional apparatus 102 an email that has as a title (a case name) "Get Information", and no body (an empty email). In this case, the destination (the address) for the email is the email address uniquely allocated for the multi-functional apparatus 102, e.g., iR5000@prn.device.co.jp. In this embodiment, by using an email having a specific case name, the client PC 103 can request from the multi-functional apparatus 102 information related to the printing setup for the multi-functional apparatus 102.

Then, as shown in FIG. 4, at step S1, the multi-functional apparatus 102 receives an email having the specific case name, "Get Information". At step S2, in accordance with the case name of the email received via the transmission/reception unit 37, the email processor 33 determines that information related to the printing setup has been requested and creates an email (referred to as a reply email), for example, as shown in FIG. 5, that includes information stored in the data storage unit 32 and is related to the printing setup, and transmits the reply email to the sender of the email.

Figure 5:
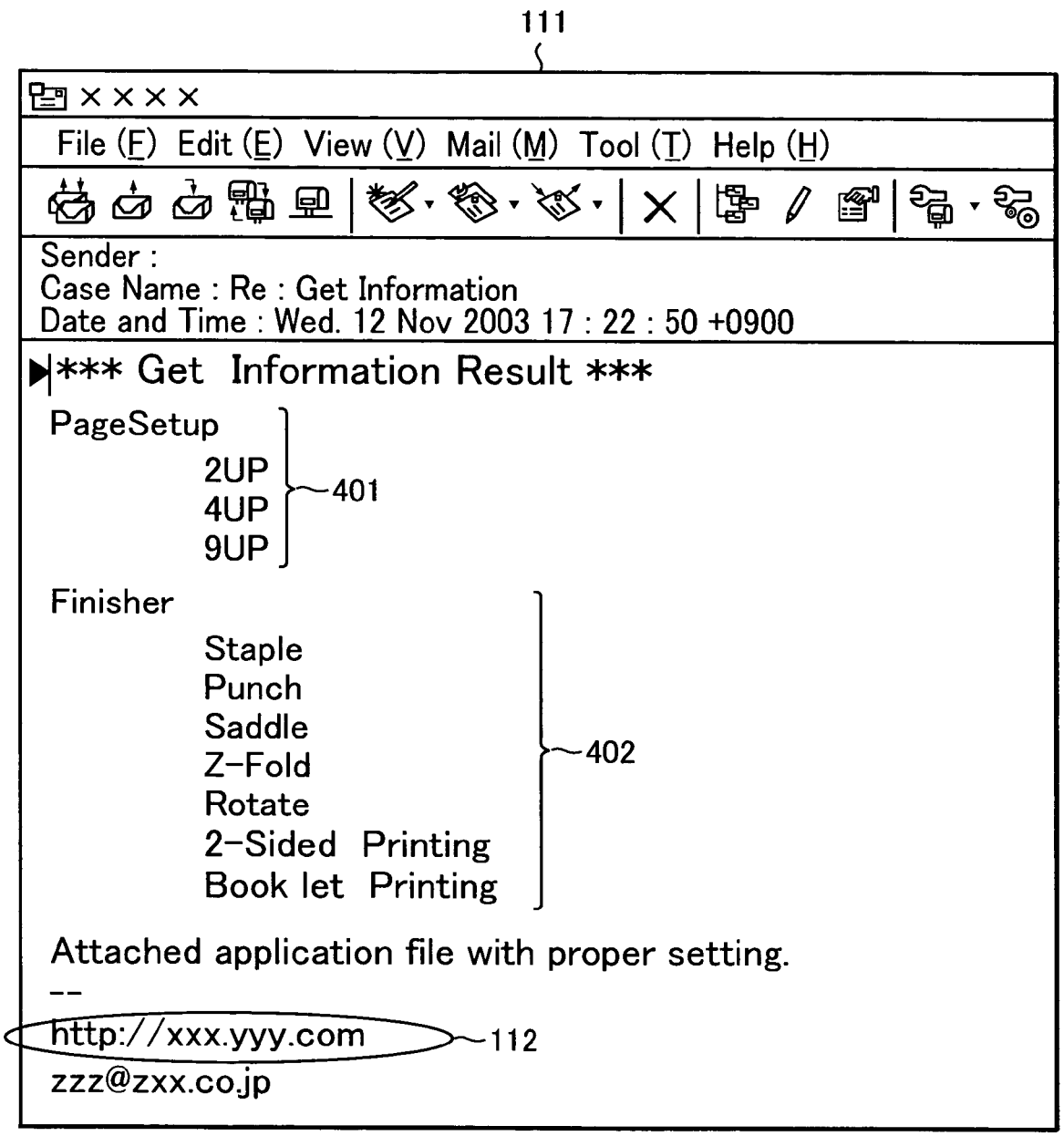
FIG. 5 is a diagram showing an example description of a reply email according to the embodiment.

FIG. 5 is a diagram showing an example of the writing in a reply email according to the embodiment. On a browsing screen 111 in FIG. 5, a reply email received by the client PC 103 is browsed using email software. As shown in FIG. 5, a "PageSetup" function entry 401, which represents the Nup function available for the multi-functional apparatus 102, a "finisher" function entry 402, which represents the finishing function available for the multi-functional apparatus 102, and an URL 112, which is used to access the GUI of the printer driver of the multi-functional apparatus 102, are included in the reply email.

Furthermore, as shown in FIG. 5, 2UP, 4UP and 9UP can be employed as the Nup functions for the multi-functional apparatus 102, and Staple, Punch, which is a function for making holes, Saddle, which is a binding and printing function, Z-Fold (Z folding), Rotate, 2-sided Printing and Booklet Printing can be employed as the finishing functions. The email processor 33 enters, in the body of the reply email, a list of the functions available at the multi-functional apparatus 102, as shown in FIG. 5.

Further, the email processor 33 does not enumerate available functions at random in the body of an email, but provides the functions by categories, such as the "PageSetup" group and the "Finisher" group. As a result, for users, the legibility is improved.

When the user of the client PC 103 has browsed the received reply email shown in FIG. 5, and has previously acquired detailed information concerning the functions available at the multi-functional apparatus 102 and the conflict conditions for the functions, the user need only reply to the email (the reply email) to easily designate the finishing function. Specifically, through editing, the user need only leave in the text the entry for a desired finishing function included in the function list in FIG. 5 and return the email to the multi-functional apparatus 102. At this time, the user attaches to the email an application file (print data) that is to be printed.

Example editing for the body of the email in FIG. 5 will be performed as follows. When printing is to be performed by setting 4UP, for example, as the Nup function and Staple as the finishing function, editing is performed so that the function name remains in the body of the email as follows.

* Get Information Result *
PageSetup
4UP
Finisher
Staple

Then, the resultant email is transmitted with an application file to be printed attached.

As is described above, when the user returns an email (reply email) that has been received from the multi-functional apparatus 102 and that includes the list of functions, the user need only employ editing to delete the functions that are not to be used, so that a correct (less incorrect) function setup can be easily performed. Furthermore, even a user who is not familiar with the format of an email used to select a printing function can employ the function.

When a user cannot gain an understanding of the details of the functions or the conflict conditions for the functions merely by reading the function names entered in the reply email received from the multi-functional apparatus 102, the user need only click on the URL 112 included in the email. Then, the user can browse, on the client PC 103, a user interface 110, shown in FIG. 7, of the printer driver that is installed in the server 101.

Figure 7:
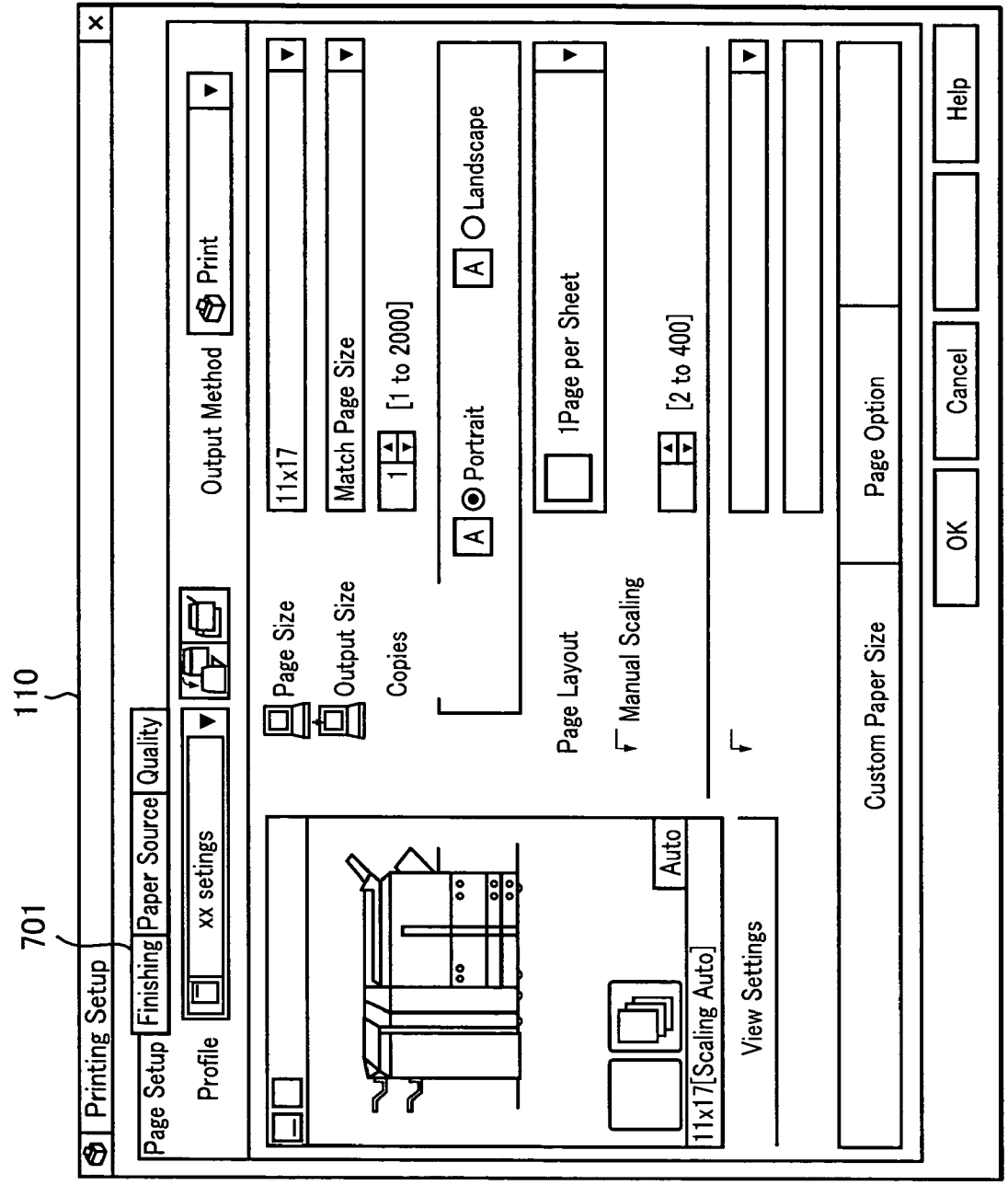
FIG. 7 is a diagram showing an example user interface for a printer driver.
Figure 9:
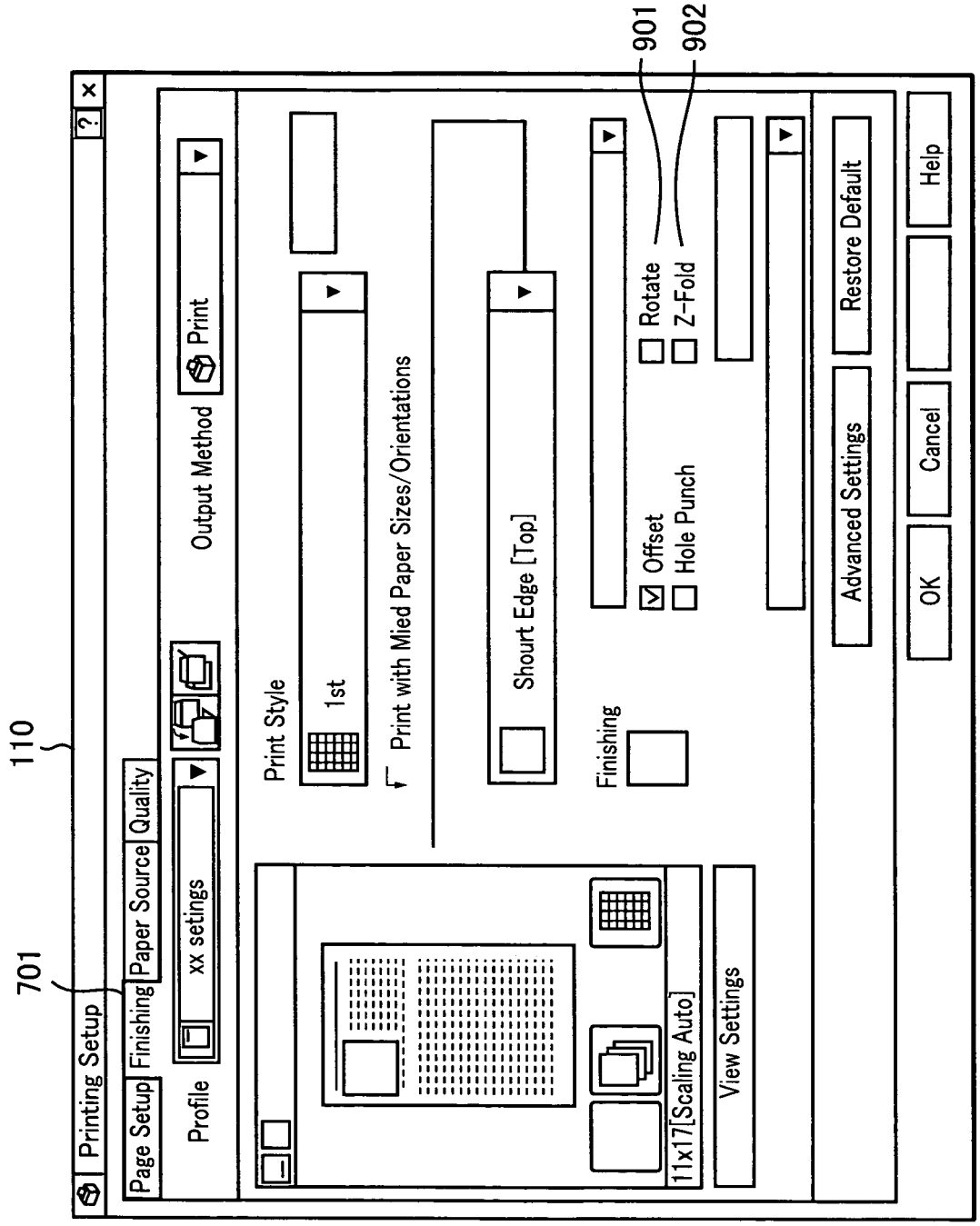
FIG. 9 is a diagram showing an example screen for a tap used to set up the finishing function by employing the user interface of the printer driver shown in FIG. 7.
Figure 10:
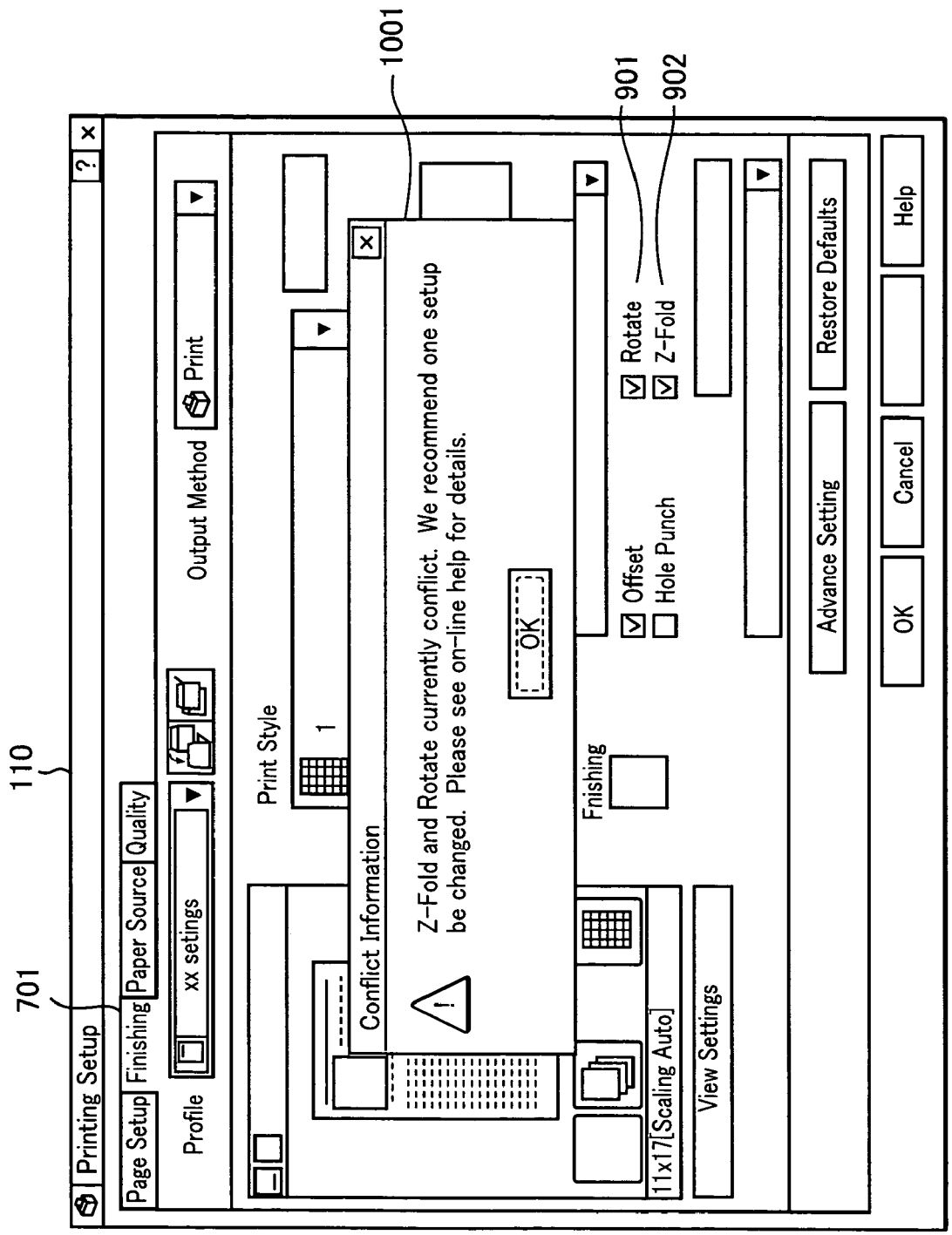
FIG. 10 is a diagram showing an example error message transmitted when a conflict has occurred at the step for the finishing function using the printer driver.

FIG. 7 is a diagram showing an example user interface for the printer driver. When a Finishing tab 701 is selected by using the pointing device for the client PC 103 while the screen shown in FIG. 7 is displayed, the screen can be changed to a screen shown in FIG. 9, for example. FIG. 9 is a diagram showing an example screen, for the tab 701, used for setting a finishing function for the user interface 110 of the printer driver. On the screen in FIG. 9, when tick marks are entered in a Rotate check box 901 and a Z-Fold check box 902 using the pointing device for the client PC 103, the screen is changed to a screen in FIG. 10 showing a pop-up window used to provide a conflict error notification for a user. FIG. 10 is a diagram showing an example popup window used to notify a user of that a conflict error has occurred during the setup performed for the finishing function on the screen in FIG. 9.

As shown in FIG. 10, a message that one of the setups should be changed, i.e., a message that a tick mark in either the Rotate or the Z-Fold check box should be deleted is displayed in a popup window 1001. A user who has read this message can remove the conflict state merely by deleting the tick mark in either the Rotate or the Z-Fold check box. In this embodiment, the user interface 110 in FIG. 7 is displayed by clicking on the URL 112 entered in the email; however, the screen in FIG. 10 may also be displayed by clicking on the URL 112 written in the email. In this case, URLs are stored in a table in correlation with conflicts, and a URL corresponding to a conflict that has occurred is transmitted using email.

By operating the user interface 110 of the printer driver, a user can ascertain whether multiple functions that are to be selected can be used together (no conflict occurs between the functions). For example, when the Rotate function is grayed out following the selection of the Z-Fold function by the printer driver, it is generally understood that these functions cannot be used together. As is described above, a user who is not familiar with a conflict condition need only refer to the conflict condition in a reply to an email (a reply email), transmitted by the multi-functional apparatus 102, to establish a setup wherein a conflict does not occur.

While referring again to FIG. 4, the processing will be described. Through the thus described operation performed by a user, the client PC 103 transmits, to the multi-functional apparatus 102, an email in which the body (the function setup information) includes only the entry of the necessary functions, and to which print data are attached. Then, at step S3, the transmission/reception unit 37 of the multi-functional apparatus 102 receives the email, which includes the function setup information and the print data. The email processor 33 extracts the function setup information and removes the print data from the email received by the transmission/reception unit 37.

At step S4, the conflict setup detector 34 refers to the function setup information obtained by the email processor 33, and detects the occurrence of a conflict between the functions designated in accordance with the function setup information. When the conflict is detected, at step S5, the email processor 33 creates an email (a conflict transmission email) indicating that a conflict, such as in FIG. 6, has occurred, and transmits the email, via the transmission/reception unit 37, to the client PC 103. FIG. 6 is a diagram showing an example description for a conflict transmission email returned when a conflict in the printing setup has occurred. On a browsing screen 114 in FIG. 6, a conflict transmission email received by the client PC 103 is browsed using email software.

As shown in FIG. 6, the title of the conflict transmission email is "Conflict Occurs!", and a message is transmitted that the printing process was not normally performed. Assume that the user has designated that the Z-Fold and the Rotate functions be performed at the same time. Since the two functions conflict with each other, the email processor 33 creates a conflict transmission email that includes information, as indicated in conflict information 501 in FIG. 6, "Attached application file with proper setting. Conflict Occurs!!Following settings conflict Z-Fold Rotate", and transmits this email to the client PC 103. Further, as shown in FIG. 6, a conflict transmission email that provides notification of this conflict includes the URL 112 for opening the user interface of the printer driver that is installed in the server 101. Therefore, the user can reconfirm the occurrence of the conflict at the multi-functional apparatus 102.

While again referring to FIG. 4, the processing will be explained. The user who received the above described conflict transmission email again edits the email. Through this process, the client PC 103 can transmit, to the multi-functional apparatus 102, the email having the body (the function setup information) that includes only the entry for the desired function. At step S6, the transmission/reception unit 37 of the multi-functional apparatus 102 receives the email that includes the function setup information, and the email processor 33 extracts the function setup information from the email received by the transmission/reception unit 37. Program control thereafter returns to step S4, and the conflict setup detector 34 detects a conflict, when it occurs in the printing setup, in accordance with the function setup information received at step S6.

Further, as described at step S5, after a conflict has occurred, the multi-functional apparatus 102 of this embodiment receives an email that does not include print data, but that does include function setup information. That is, the client PC 103 does not attach print data to the reply email for the conflict transmission email. This occurs because the multi-functional apparatus 102 has already received the print data at step S3. Since once the print data is received it is stored, an increase in the communication volume can be avoided. When an increase in the communication volume is not a problem, however, the client PC 103 may attach print data to a reply to the conflict transmission email.

When a conflict is not detected at step S4 (NO at step S4), at step S7, the printing setup unit 35 performs the function setup process (the printing setup process) in accordance with the function setup information obtained by the email processor 33. At step S8, the print controller 36 permits the image forming apparatus 21 to perform the printing processing and the post-processing (finishing processing), for the print data obtained by the email processor 33, in accordance with the printing setup established by the printing setup unit 35.

As is described above, upon receiving an email having a specific title, the multi-functional apparatus 102 of this embodiment returns an email (hereinafter referred to as a function list email) that includes the function list for the multi-functional apparatus 102 and information (printer driver storage location information) referring to explanatory function data. The user edits a reply email for the function list email, leaving only the entries for desired functions, and transmits the email (hereinafter referred to as a print request email), which includes function setup information, for designating desired functions, and attached print data. When there is no conflict in the function setup information included in the received print request email, the multi-functional apparatus 102 performs the printing processing and the post-processing in accordance with the printing setup indicated by the function setup information. According to this arrangement, even in a driverless environment wherein the printer driver program for the multi-functional apparatus 102 is not present in the client PC 103, the user can easily identify the finishing processes available for the multi-functional apparatus 102, and can use a simple method to designate the printing post-processing. That is, the multi-functional apparatus 102 can provide a printing service according to which the finishing function can be designated in a driverless environment, and the printing process can be performed in accordance with the setup.

In addition, according to the multi-functional apparatus 102 of the embodiment, since the URL 112 of the printer driver is included within the body of the email, a user who is not familiar with the conflict condition can use the URL 112 to refer to information available at the printer driver. That is, when the user clicks on the URL 112, the user interface of the printer driver installed in the server 101 that is designated by the URL 112 is displayed. In this manner, since the user refers to the printer driver that (generally) is periodically updated by the maker of the multi-functional apparatus 102, the user can always refer to the latest conflict condition for the multi-functional apparatus 102. Further, since the user interface for the common printer driver is familiar to the user, the user can easily understand whether the finishing process that is to be performed has been enabled. The information that the user can refer to, which is based on the body of the email, is not limited to the printer driver, and can be content that enables the user to browse the function of the multi-functional apparatus 102 or information related to a conflict between functions.

Further, in this embodiment, when a user designates a set of incorrect finishing functions, the multi-functional apparatus 102 can detect this, and can create and transmit an email indicating that a conflict has occurred. With this email, the user can apprehend that a conflict has occurred before beginning the printing process, and can edit the notification email to easily establish a correct function setup.

Another Embodiment

In the above embodiment, the multi-functional apparatus 102 has obtained information for the available post-processing, and has transmitted an email to which an application file (print data) has been attached. As another embodiment, an explanation will be given for a processing method whereby an email, to which an application file to be printed has been attached, is transmitted first, and then, information for the post-processing is obtained using a reply email and the post-processing is designated. Since the hardware configuration and the functional arrangement of a multi-functional apparatus 102 in this embodiment are the same as the hardware configurations shown in FIGS. 1 and 2, for the above embodiment, and the functional arrangement in FIG. 3, no further explanation for them will be given.

Figure 8:
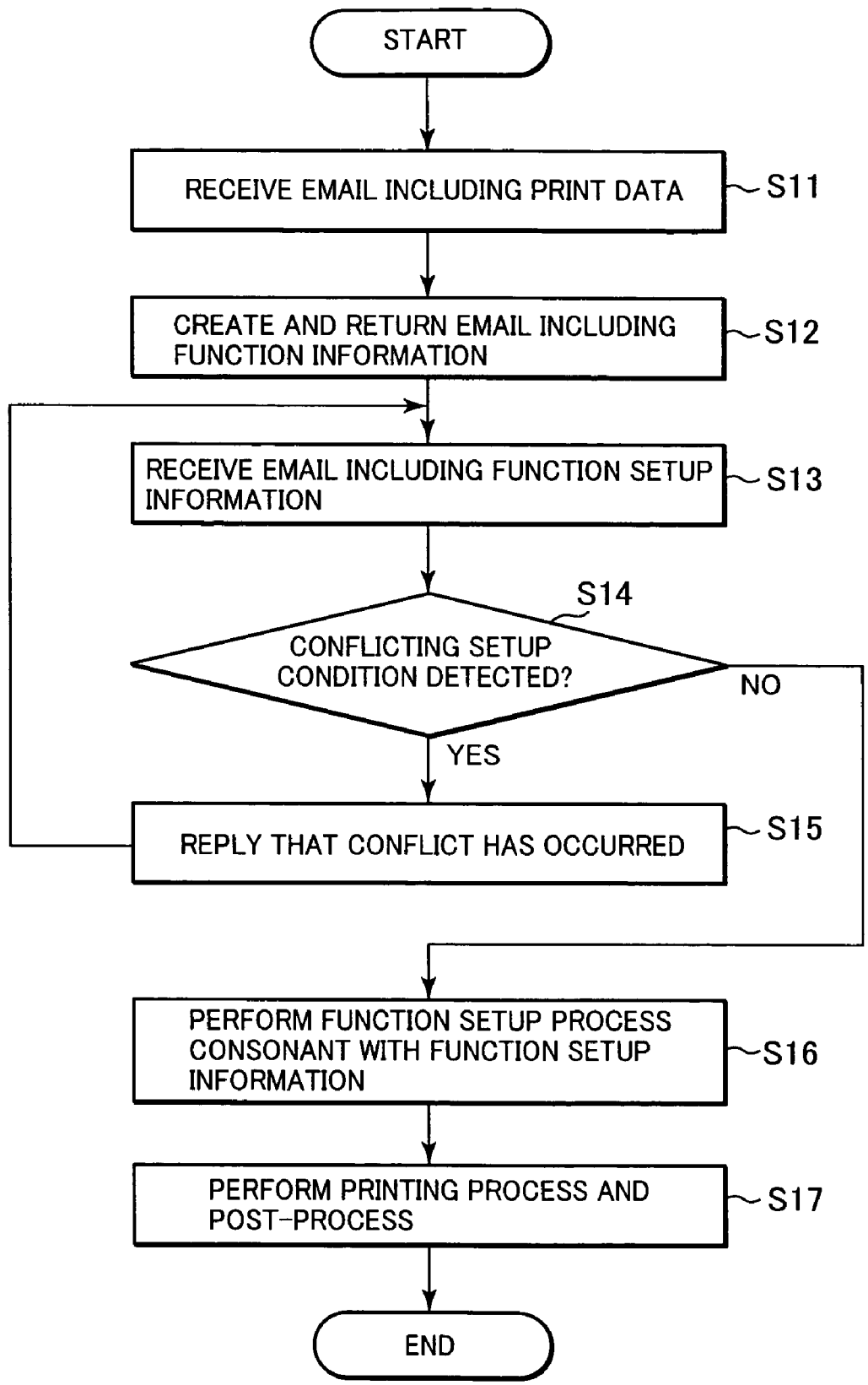
FIG. 8 is a flowchart showing the finishing function setup processing performed in the driverless environment by a multi-functional apparatus according to another embodiment of the invention, and the printing processing performed in consonance with the setup.

FIG. 8 is a flowchart showing the finishing function setup processing performed, according to this embodiment, by the multi-functional apparatus 102 in a driverless environment, and the printing processing performed in accordance with the setup.

As a prerequisite for the processing in FIG. 8, first, a client PC 103 transmits, to the multi-functional apparatus 102, an email to which an application file to be printed (print data) is attached. At this time, the email address of the destination is uniquely allocated to the multi-functional apparatus 102, e.g., iR5000@prn.device.co.jp. In this embodiment, the case name for the email is an arbitrary name, such as "Get Information", as in the previous embodiment. Since the processes at steps S14 to S17 in FIG. 8 correspond to the processes at steps S4, S5, S7 and S8 in FIG. 4, in the above embodiment, overall, the processing will be explained only briefly.

At step S11 in FIG. 8, a transmission/reception unit 37 for the multi-functional apparatus 102 receives the email to which the print data has been attached. At step S12, when an email processor 33 determines that the print data are attached to the email received by the transmission/reception unit 37, the email processor 33 creates an email (reply email) that includes function information that is obtained from the information storage unit 32 and that is related to the function that can be set at the multi-functional apparatus 102, and returns the email to the client PC 103. The client PC 103 receives the reply email and displays the received email using email software, as shown in FIG. 5. The functions available to the multi-functional apparatus 102 are the same as those in the previous embodiment.

A user who has prior knowledge of the conflict conditions for all the functions, can edit a reply email so as to leave only an entry for a desired finishing function, and can transmit the reply email to the multi-functional apparatus 102. Since the email editing process is performed in the same manner as in the above embodiment, no further explanation for it will be given. When the email editing process has been completed, the user transmits the edited email. And since in this embodiment the print data has been already transmitted, no print data is attached to the edited email.

Furthermore, as well as in the above embodiment, a user who lacks knowledge concerning the conflict conditions for all the functions need only click on the URL 112 entered in the reply email, so that the user interface 110 of the printer driver can be browsed and manipulated. Thus, the user can ascertain whether a conflict has occurred in a set of functions that are to be selected.

At step S13, the email processor receives, via the transmission/reception unit 37, the email edited by the user, and obtains the function setup information included in the email. At step S14, a conflict setup detector 34 refers to the function setup information obtained by the email processor 33 and detects a conflict, when it occurs, between the functions designated in accordance with the function setup information. When a conflict is detected, at step S15, as well as in the above embodiment, the email processor 33 creates an email (a conflict transmission email) that a conflict shown in FIG. 6 has occurred, and transmits the email to the client PC 103 via the transmission/reception unit 37. Program control thereafter returns to step S13.

When a conflict is not detected at step S14 (NO at step S14), at step S16, a printing setup unit 35 performs the function setup process (the printing setup process) in accordance with the function setup information obtained by the email processor 33. At step S17, a printing controller 36 permits an image forming apparatus 21 to perform the printing processing and the post-processing (the finishing processing), for the print data received at step S11, in accordance with the printing setup established by the printing setup unit 35.

As is described above, in this embodiment, upon receiving the email to which print data are attached, the multi-functional apparatus 102 returns an email (hereinafter referred to as a function list email) that includes the function list for the multi-functional apparatus 102 and information (printer driver storage location information) used to refer to the function explanatory information. Further, a user edits the function list received via email, and returns an email (hereinafter refer to a function designation email) designating a desired function. The multi-functional apparatus 102 receives the function designation email, and when a conflict is not detected in the function setup indicated in the received email, performs the printing processing and the post-processing in accordance with the function setup. With this arrangement, even in a driverless environment wherein the printer driver program for the multi-functional apparatus 102 has not been prepared in the client PC 103, the user can easily understand what finishing processes are available at the multi-functional apparatus 102, and can employ a simple method to designate the printing post-processing desired. That is, the multi-functional apparatus 102 can provide a printing service in accordance with which, in a driverless environment, a finishing function can be designated and performed.

According to this embodiment, the email processor 33 determines, relative to the email, a process in accordance with the case name for the email and the presence/absence of attached data. However, the email processor 33 may determine the process to be performed for an email based, for example, on a specific character string included in the email, the presence/absence of a case name for the email, or the type of data attached to the email.

In the above embodiments, the functions of the individual sections of the multi-functional apparatus 102 in FIG. 3 are provided by reading a program from a memory, such as the HDD 13 in FIG. 1, and the program being executed by the first CPU 8 or the second CPU 16. However, the present invention is not limited to this, and part or all of the functions may be provided by special hardware. The memory is not limited to an HDD, and may be a magneto-optical disk, a nonvolatile memory such as a flash memory, a read-only recording medium such as a CD-ROM, a volatile memory other than a RAM, or a combination of these computer-readable and writable recording media.

The processes described in the embodiments may be performed when a program that provides the functions of the multi-functional apparatus 102 in FIG. 3 is recorded on a computer-readable recording medium, and is read and executed by a computer system. It should be noted that a "computer system" includes an OS and hardware components, such as peripheral devices. Specifically, the following case is also included in this invention. A program read from a recording medium is written to a memory prepared in a function extension board that is inserted into a computer, or in a function extension unit that is connected to the computer, and based on an instruction issued by the program, a CPU installed on the function extension board or in the function extension unit performs part or all of the actual processing, and by means of this processing, the functions of the above embodiments are provided.

A "computer-readable recording medium" is a flexible disk, a magneto-optical disk, a ROM, a portable disk such as a CD-ROM, or a storage device such as a hard disk incorporated in a computer system. Further, the "computer-readable recording medium" also includes a memory wherein a program is stored for a predetermined period of time, such as a volatile memory (RAM) that is provided inside a computer system that serves as a server or a client when a program is transmitted via a network, such as the Internet, or a communication line, such as a telephone line.

The program may be transmitted by a computer system, which stores the pertinent program internally, in a storage device, via a transfer medium, or a transfer wave in the transfer medium, to another computer system. The "transfer medium" that transmits the program is a medium, such as a network (a communication network) like the Internet, or a communication line, such as a telephone line, having a function for the transmission of information.

The program may be a program that provides part of the above functions, or a so-called differential file (a differential program) that, together with a program previously recorded in the computer system, can provide the above described functions.

A program product, such as a computer-readable recording medium on which the program is recorded, can also be applied for the invention. The program, the recording medium, the transfer medium and the program product are included within the scope of the invention.

The embodiments of the present invention have been described in detail while referring to the drawings; however, the specific configurations are not limited to these embodiments, and various other designs can also be included without departing from the subject of the present invention.

As described above, according to the embodiments, a user can easily understand the available post-processing, even in a driverless environment in which a driver program, corresponding to an output processing apparatus such as a printer, is not present in a computer terminal employed by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2004-248566, filed Aug. 27, 2004, which is hereby incorporated by reference herein in its entirety.

What is claimed is:

1. An output processing apparatus comprising:
   an output unit configured to perform an output process relative to an output medium that is based on output data;
   an email processing unit configured to transmit and receive email via a network; and
   a transmission unit configured to transmit to an email transmission source a reply email including function information related to multiple functions available for the output process, responsive to the email processing unit receiving an email that includes at least one of a specific case name, a specific character string, and a specific attached file,
   wherein the multiple functions available for the output processing include conflicting functions and the reply email includes reference information for referring to a conflict between the functions.

2. An output processing apparatus according to claim 1, wherein the output data is print data, the output process is a printing process, and the output medium is a printing enabled medium.

3. An output processing apparatus according to claim 2, wherein the reference information written in the reply email includes information used to refer to a printer driver for setting the printing process.

4. An output processing apparatus comprising:
   an output unit configured to perform an output process relative to an output medium that is based on output data;
   an email processing unit configured to transmit and receive email via a network;
   a transmission unit configured to transmit to an email transmission source a reply email including function information related to multiple functions available for the output process, responsive to the email processing unit receiving an email that includes at least one of a specific case name, a specific character string, and a specific attached file;
   a setup unit configured to perform a function setup, wherein responsive to the email transmission source transmitting a setup information email that includes function setup information relating to a desired function to be set based on the function information included in the reply email, and responsive to the email processing unit receiving the setup information email, the setup unit performs the function setup in accordance with the function setup information included in the setup function email;
   an output control unit controlling the output unit to perform the output process in accordance with the function setup by the setup unit; and
   a conflict detection unit configured to detect, responsive to the multiple functions available for the output process including conflicting functions, a conflict between the multiple functions due to a function setup performed in accordance with the function setup information that is included in the setup information email received by the email processing unit.

5. An output processing apparatus according to claim 4, wherein the output process performed by the output unit includes an organizing process relative to multiple output media, and wherein the function setup information includes information for setting a function related to the organizing process.

6. An output processing apparatus according to claim 4, wherein the output data outputted by the output unit is attached to one of the email and the setup information email received by the email processing unit.

7. An output processing apparatus according to claim 4, further comprising a conflict transmission unit configured to transmit, responsive to the conflict detection unit detecting a conflict occurring between the multiple functions, a conflict transmission email that a conflict has occurred to the transmission source of the setup information email.

8. An output processing method employing an output processing apparatus including an output unit operable to perform an output process relative to an output medium based on output data, and an email processing unit configured to transmit and receive email via a network, the method comprising the following steps;
   a first reception step of receiving in the email processing unit an email that includes at the least one of a specific case name, a specific character string and a specific attached file; and
   a transmission step of transmitting, to a transmission source of the email received at the first reception step, a reply email that includes function information related to multiple functions available for the output process
   wherein the multiple functions available for the output processing include conflicting functions and the reply email includes reference information for referring to a conflict between the functions.

9. An output processing method according to claim 8, further comprising:
   responsive to the email transmission source transmitting a setup information email that includes function setup information relating to a desired function to be set based on the function information included in the reply email, a second reception step of receiving in the email processing unit the setup information email;
   a setup step of setting up a function in accordance with the function setup information included in the setup function email; and
   an output control step of controlling the output unit to perform the output process in accordance with the function setup by the setup unit.

10. An information processing apparatus comprising:
a reception unit configured to receive an email that includes function information for a printer;
an editing unit configured to edit the function information included in the email received by the reception unit; and
a transmission unit configured to transmit, to the printer, an email including the function information edited by the editing unit,
wherein in a case in which there is a conflict in a combination of the function information included in the email transmitted by the transmission unit, the reception unit receives an email indicating that there is a conflict in the combination of the function information.

11. An information processing apparatus according to claim 10, wherein the transmission unit transmits to the printer an email that includes the function information edited by the editing unit and a document to be printed.

12. An information processing method comprising the following steps:
a reception step of receiving an email that includes function information for a printer;
an editing step of editing the function information included in the email received at the reception step; and
a transmission step of transmitting, to the printer, an email that includes the function information edited at the editing step,
wherein when there is a conflict in a combination of the function information included in the email transmitted at the transmission step, the reception step includes receiving an email indicating that there is a conflict in the combination of the function information.

13. An information processing method according to claim 12, wherein the transmission step includes transmitting, to the printer, an email that includes the function information edited at the editing step and a document to be printed.

14. A computer-executable program stored on a recording medium and executable by a computer to perform the information processing method according to claim 12.

15. A computer-executable program stored on a recording medium and executable by a computer to perform the information processing method according to claim 13.

* * * * *